United States Patent
Farhat et al.

(10) Patent No.: US 11,060,601 B2
(45) Date of Patent: Jul. 13, 2021

(54) DIFFERENTIAL WITH PASSIVE THERMAL-MANAGEMENT SYSTEM

(71) Applicant: Ford Global Technologies, LLC, Dearborn, MI (US)

(72) Inventors: Hassan Farhat, Novi, MI (US); Ravi Gopal, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 16/717,056

(22) Filed: Dec. 17, 2019

(65) Prior Publication Data

US 2021/0180680 A1 Jun. 17, 2021

(51) Int. Cl.
| | |
|---|---|
| F16H 47/04 | (2006.01) |
| F16H 57/04 | (2010.01) |
| F16H 48/38 | (2012.01) |
| F16H 48/08 | (2006.01) |
| F16K 31/00 | (2006.01) |

(52) U.S. Cl.
CPC ......... *F16H 57/0413* (2013.01); *F16H 48/08* (2013.01); *F16H 48/38* (2013.01); *F16H 57/0416* (2013.01); *F16H 57/0436* (2013.01); *F16H 57/0483* (2013.01); *F16K 31/002* (2013.01)

(58) Field of Classification Search
None
See application file for complete search history.

(56) References Cited

U.S. PATENT DOCUMENTS

| | | | | |
|---|---|---|---|---|
| 2,968,190 | A | * 1/1961 | Orr | F16H 57/0427 74/467 |
| 4,352,301 | A | * 10/1982 | Fleury | F16H 57/0434 184/6.12 |
| 4,915,192 | A | 4/1990 | Hayashida et al. | |
| 5,316,106 | A | 5/1994 | Baedke et al. | |
| 5,540,300 | A | * 7/1996 | Downs | F16H 57/0412 184/104.1 |
| 5,595,214 | A | * 1/1997 | Shaffer | B60K 17/20 137/513.5 |
| 5,749,801 | A | * 5/1998 | Teraoka | F16H 48/08 475/88 |
| 6,360,840 | B1 | * 3/2002 | Bell | F16H 57/0412 180/339 |
| 6,432,018 | B1 | 8/2002 | Morse et al. | |

(Continued)

*Primary Examiner* — Dirk Wright
(74) *Attorney, Agent, or Firm* — Vincent Mastrogiacomo; Brooks Kushman P.C.

(57) ABSTRACT

A differential assembly includes a housing defining an oil sump, a differential disposed in the housing, and a thermal-management system. The thermal-management system includes an oil pump in fluid communication with the sump, an oil-to-air heat exchanger external to the housing, and a passive valve assembly. The passive valve assembly has an inlet connected to the pump, a first outlet connected to the heat exchanger, and a second outlet connected to a conduit disposed within the housing. The valve assembly further has a valve movable to a first position in which the inlet and the first outlet are in fluid communication and to a second position in which the inlet and the second outlet are in fluid communication. The valve is configured to be in the first position in response to the oil exceeding a first threshold temperature.

14 Claims, 5 Drawing Sheets

(56) References Cited

U.S. PATENT DOCUMENTS

| | | | |
|---|---|---|---|
| 6,997,284 B1* | 2/2006 | Nahrwold | F16H 57/0447 |
| | | | 165/117 |
| 8,707,826 B2* | 4/2014 | Jacobs | F16H 57/0447 |
| | | | 74/607 |
| 8,715,127 B2 | 5/2014 | Beutler et al. | |
| 8,739,932 B2* | 6/2014 | Ramler | F01M 1/10 |
| | | | 184/6.22 |
| 9,103,433 B2* | 8/2015 | Kwasniewski | F16H 57/0445 |
| 9,163,553 B2* | 10/2015 | Matsusaka | F16K 31/0658 |
| 9,309,961 B2* | 4/2016 | Martucci | F16H 57/045 |
| 9,897,253 B2* | 2/2018 | Delp | F16N 39/06 |
| 10,190,673 B2* | 1/2019 | Creech | F16H 57/045 |
| 2017/0096115 A1 | 4/2017 | Delp et al. | |
| 2017/0167595 A1 | 6/2017 | Cole et al. | |

* cited by examiner

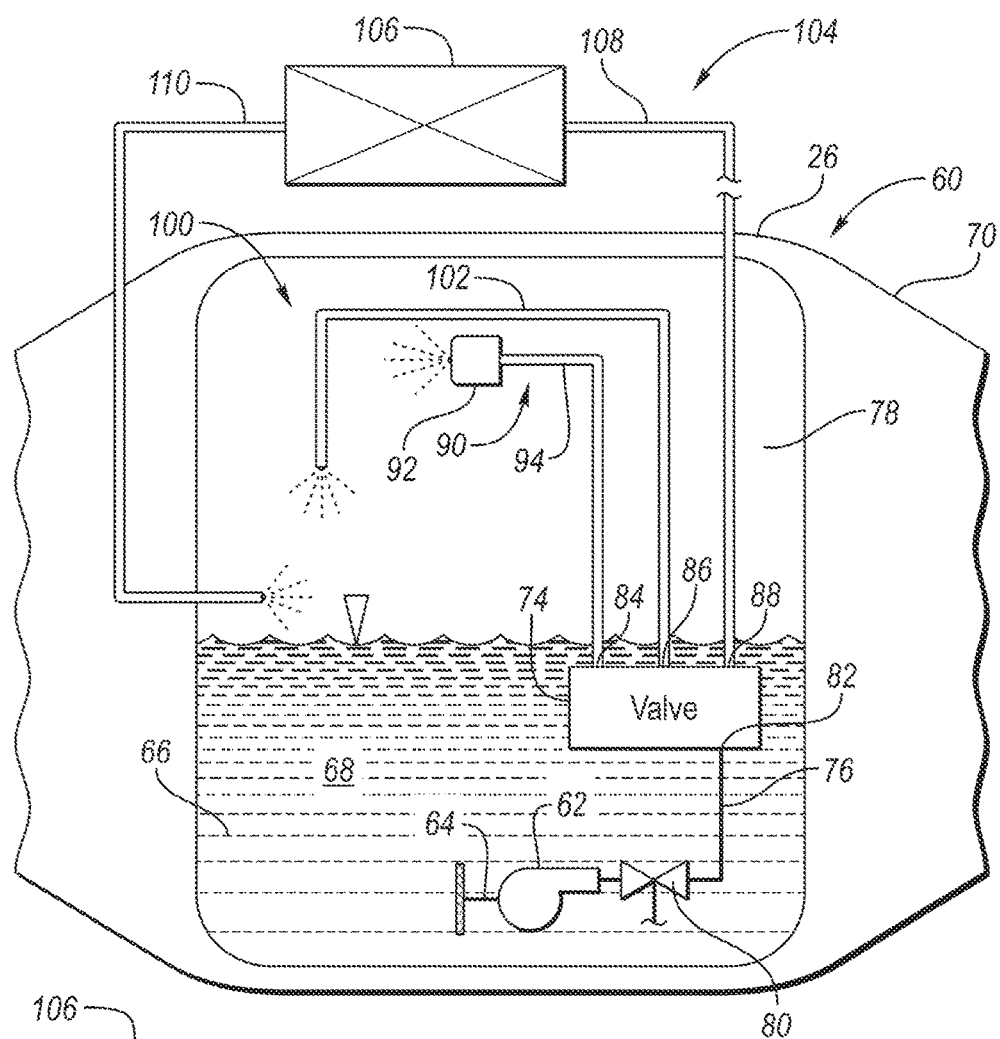
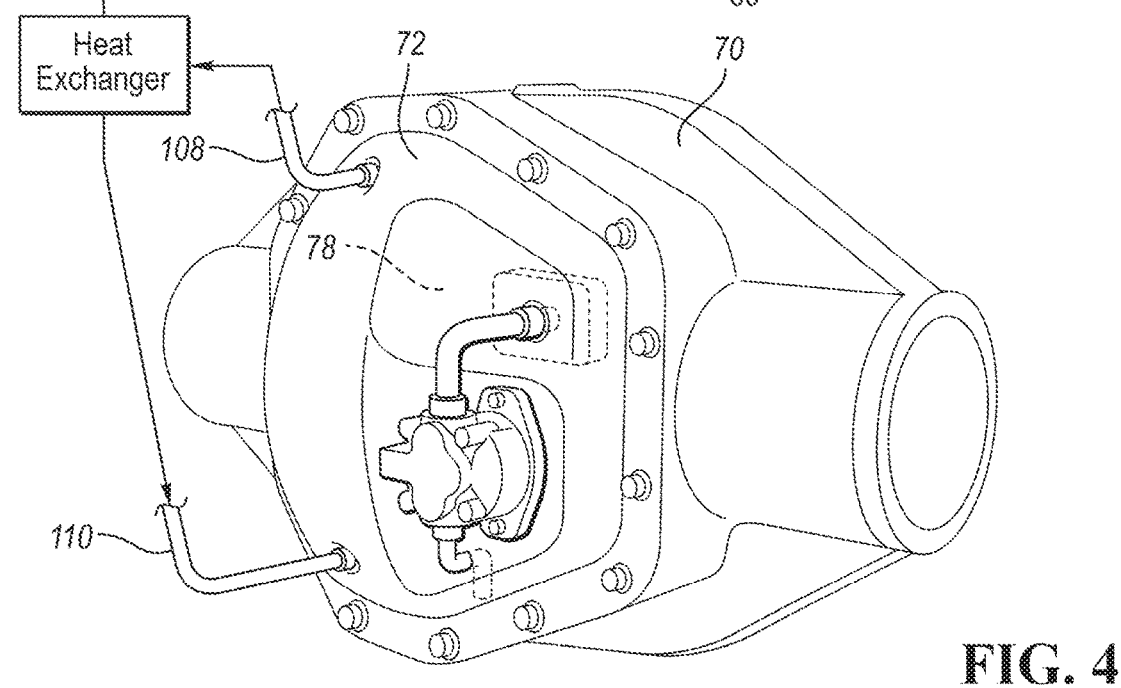
FIG. 3
FIG. 4

DIFFERENTIAL WITH PASSIVE THERMAL-MANAGEMENT SYSTEM

TECHNICAL FIELD

This application relates to differential assemblies and more specifically to differential assemblies having thermal-management systems.

BACKGROUND

Motor vehicles may include a differential on the drive axle to transmit torque produced by an engine to driven wheels of the vehicle. The differential allows the driven wheels to rotate at different speeds relative to each other. This allows the outer wheel to rotate faster than the inner wheel when the vehicle is turning.

A typical open differential includes a ring gear meshing with a pinion gear that is fixed to a driveshaft. A differential carrier is fixed to the ring gear and is supported for rotation within a housing of the differential. The carrier supports a pair of side gears and a pair of spider gears in meshing engagement with the side gears. The side gears are driveably connected to the driven wheels. The spider gears transmit torque from the carrier to the side gears to propel the vehicle. Open differentials have difficulty propelling the vehicle when one of the driven wheels is on a low-traction surface as torque from the engine is routed to the low-traction wheel resulting is wheel spin.

Limited-slip differentials were developed to overcome the drawbacks of open differentials. Typical limited-slip differentials include a clutch pack and a spring that cooperate to engage a side gear, associated with the higher-traction wheel, with the carrier to provide engine torque to both driven wheels.

SUMMARY

According to one embodiment, a differential assembly includes a housing defining an oil sump, a differential disposed in the housing, and a thermal-management system. The thermal-management system includes an oil pump in fluid communication with the sump, an oil-to-air heat exchanger external to the housing, and a passive valve assembly. The passive valve assembly has an inlet connected to the pump, a first outlet connected to the heat exchanger, and a second outlet connected to a conduit disposed within the housing. The valve assembly further has a valve movable to a first position in which the inlet and the first outlet are in fluid communication and to a second position in which the inlet and the second outlet are in fluid communication. The valve is configured to be in the first position in response to the oil exceeding a first threshold temperature.

According to another embodiment, a differential assembly include a housing defining an oil sump, a differential disposed in the housing, and a thermal-management system. The system includes an oil pump in fluid communication with the sump, a spool valve having an inlet connected to the pump, a first outlet, a second outlet, and a spool slidable to a first position in which the inlet is in fluid communication with the first outlet and to a second position in which the inlet is in fluid communication with the second outlet. The spool valve further has a chamber containing wax configured to move the spool according to a temperature of the wax such that the spool is in the first position when the temperature of the wax is within a first temperature range and is in the second position when the temperature of the wax is within a second temperature range.

According to yet another embodiment, a viscous-dissipation heater assembly includes a body including an inlet and an outlet, and a valve having a metering portion disposed in the body between the inlet and the outlet and a driven portion external to the body. The valve is actuatable to adjust size of an opening defined between the metering portion and the body. An actuator arrangement configured to actuate the valve. The actuator arrangement includes a hydraulic cylinder defining a hydraulic chamber and an orifice opening into the chamber and having a piston disposed in the hydraulic chamber. The piston is biased in a first direction and is configured to move in a second direction in response to fluid pressure within the chamber overcoming the bias. A drive mechanism is connected between the piston and the driven portion. Movement of the piston in the first direction reduces the size of the opening and movement of the piston in the second direction increases the size of the opening.

BRIEF DESCRIPTION OF THE DRAWINGS

FIG. 3 is a schematic diagram of the thermal management system.

FIG. 4 is a perspective view of the differential assembly according to one or more embodiments.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
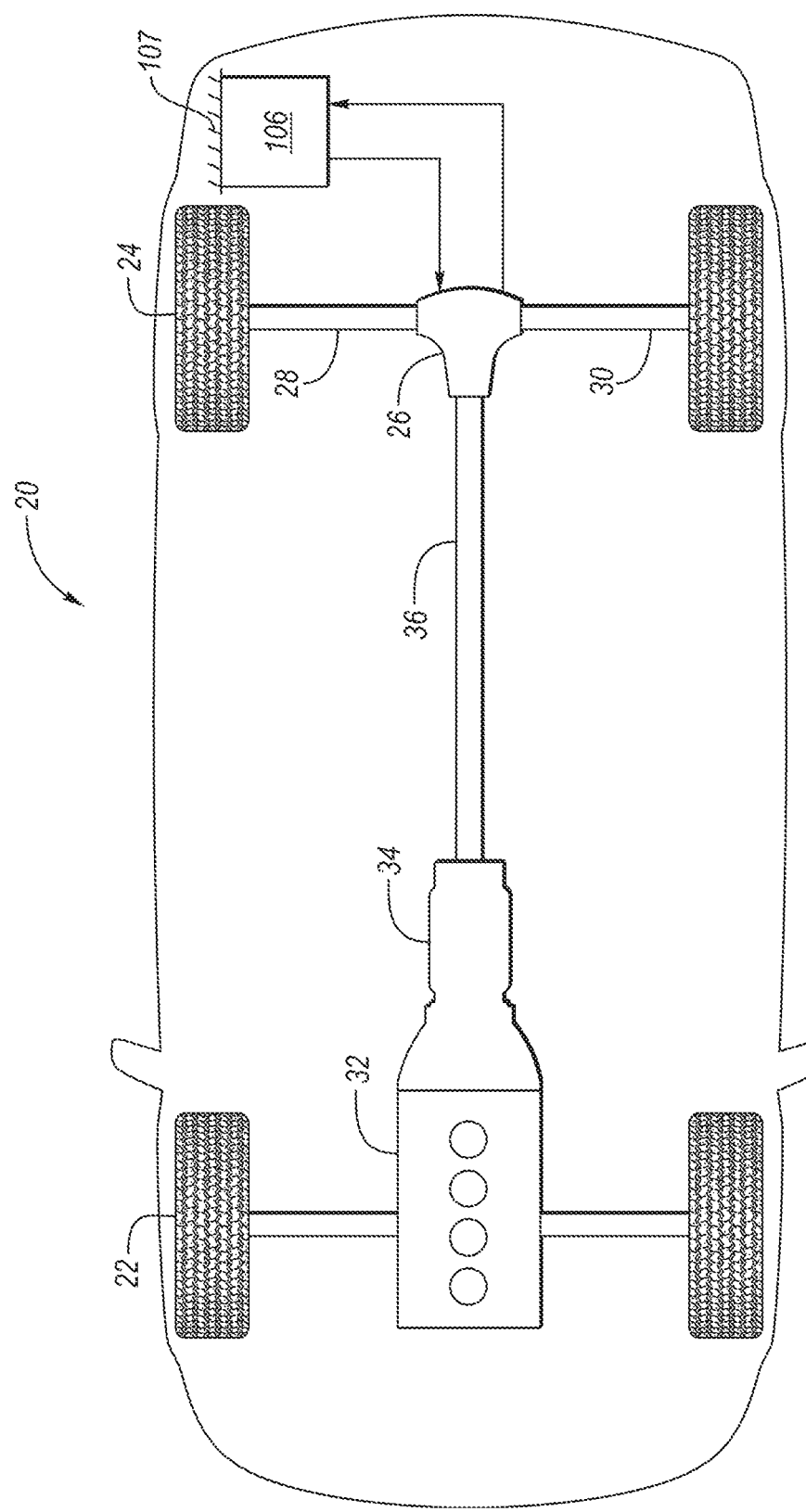
FIG. 1 is a schematic diagram of a vehicle including a differential assembly that includes a thermal management system.

Referring to FIG. 1, a vehicle 20 includes front wheels 22 and rear wheels 24. In the illustrated embodiment, the vehicle 20 is rear-wheel drive and the rear wheels 24 are powered by a powertrain including an engine 32 and/or an electric motor. A transmission 34 is connected to the engine 32. A driveshaft 36 may transmit power from the transmission 34 to the rear wheels 24 via a differential assembly 26 (which is sometimes referred to simply as a "differential") and left and right half shafts 28, 30. The vehicle 20 could also be front-wheel drive, all-wheel drive, or four-wheel-drive, in which case, the front wheels may include an associated differential. In a front-wheel-drive configuration, the differential may be housed within the transmission.

Figure 2:
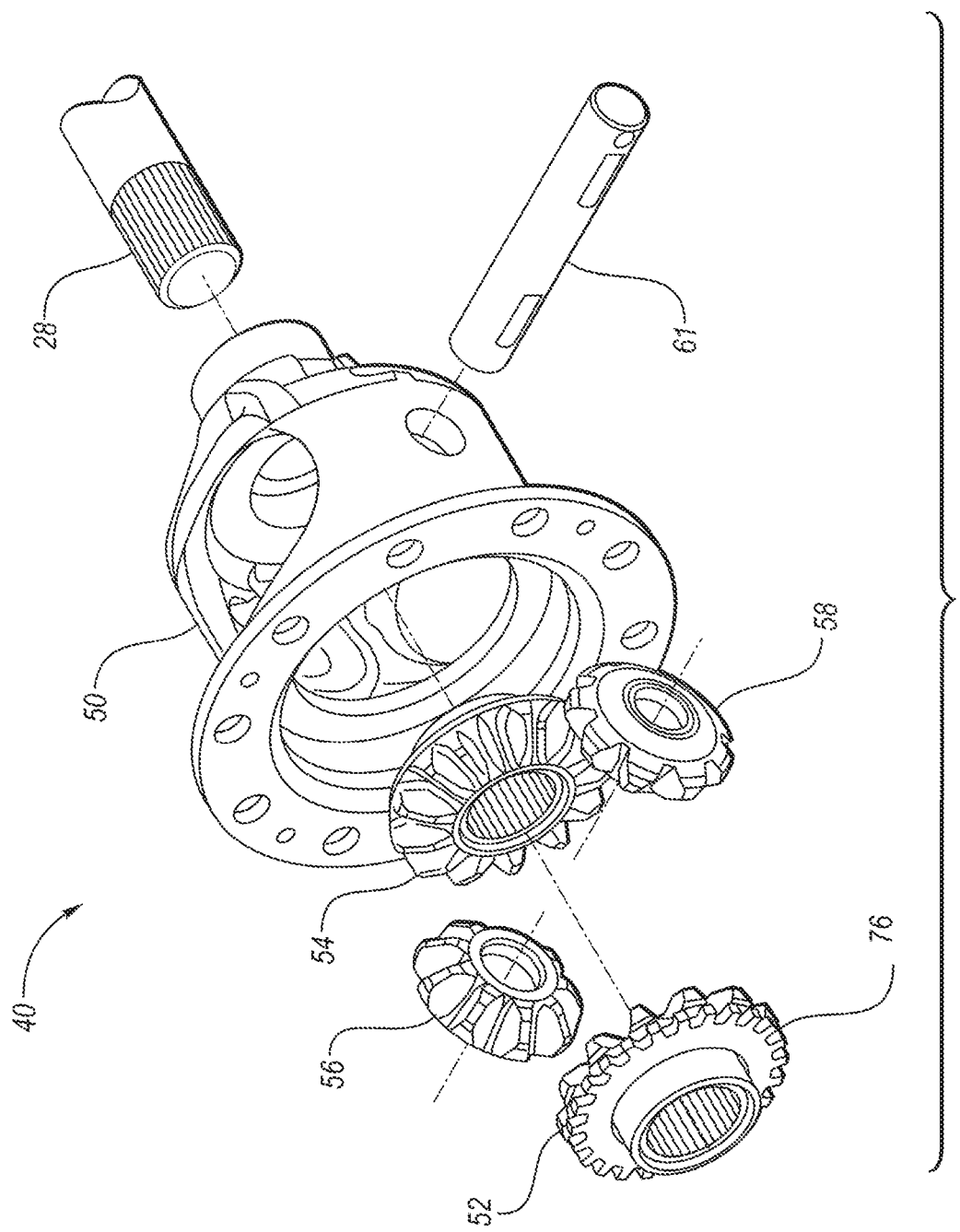
FIG. 2 is an exploded view of the differential of FIG. 1.

Referring to FIG. 2, the differential assembly 26 includes a housing (not shown) and a differential 40 disposed in the housing. The differential 40 may be an open differential, a limited-slip differential, a locking differential, or combinations thereof. The differential 40 enables the left and right driven wheels 24 to have different speeds during cornering. The differential 40 includes a carrier 50 supported for rotation within the housing and configured to receive power from the powertrain. The carrier 50 may include an end cap (not shown). For example, the carrier 50 may support to a bevel gear (not shown) that meshes with a pinion gear fixed to the driveshaft 36.

The carrier 50 may support a pair of opposing first and second side gears 52, 54 and a pair of opposing first and second spider gears 56, 58 in meshing engagement with the side gears. A shaft 60 may extend through the carrier 50 to interconnect the spider gears 56, 58. The first side gear 52 is configured to transmit torque to the left half shaft 30, and the second side gear 54 is configured to transmit torque to the right half shaft 28. The half shafts may be splined to the side gears. The side gears 52, 54 and the spider gears 56, 58 may be supported for rotation on the carrier 50.

Referring to FIGS. 3 and 4, a main source of losses within the differential assembly 26 is between the rotating components and the oil 68. The viscosity of the oil 68 is dependent upon temperature. The viscosity decreases with temperature. Therefore, differential losses can be reduced by actively heating the oil to the operating range. The losses can also be reduced by using less viscous oils. These oils, however, sometimes have a lower maximum temperature and may require active cooling. To increase fuel economy and promote more uniform operation, the differential assembly 26 includes a thermal-management system 60 configured to thermally regulate the temperature of oil 68. The thermal-management system 60 may be mechanically powered and passively operated, i.e., no electronics are required, or alternatively, may include one or more electric components. Used herein, "passive" refers to components that self-actuate without the need for electronics. The thermal-management system 60 may be configured to heat and/or cool the differential oil 68 depending upon the embodiment employed.

The thermal-management system 60 includes a pump 62 having a pickup tube 64 in fluid communication with an oil sump 66. The pickup tube may include a magnetic strainer. The pump 62 may be a positive-displacement pump that is powered by either the powertrain or by an electric motor. The pump 62 may be disposed within a housing 70 of the differential assembly 26 or may be at least partially external to the housing. As illustrated in FIG. 4, the pump 62 may be mounted on a cover 72 of the housing 70. The pump 62 may be mechanically driven by rotation of the carrier 50. The pump 62 may include a portion that extends into the housing through the front cover 72 and driveably connects to the carrier 50. For example, the carrier 50 may include a second bevel gear that meshes with a pinion gear of the pump 62. In other embodiment, the pump 62 may be coupled to the pinion gear of the driveshaft or driven by any other rotating component of the differential 40.

Driving the pump 62 with the driveline allows the pump to be driven with vehicle inertia energy (free energy) when the vehicle is coasting or slowing down. A clutch or similar device (optional) may be used to decouple the pump 62 from the driveline when the vehicle is accelerating so that the pump 62 is only driven with the free energy. If the pump 62 is electric, a controller may be programmed to operate the pump in an efficient manner.

The pump 62 is in fluid communication with a valve assembly 74 via a supply conduit 76. The valve assembly 74 may be supported on an inside surface 78 of the cover 72. The valve assembly 74 may be at least partial immersed in the oil 68, e.g., located within the sump 66. A pressure-release valve 80 may be disposed between the pump 62 and the valve assembly 74. The pressure-release valve 80 may be packaged with in the pump 62 or as a separate component. The valve assembly 74 switches the thermal-management system 60 between the various modes of operation such as heating mode, cooling mode, and bypass mode. The valve assembly 74 may be passive and automatically actuate based on changes in temperature without the need for electronic control. For example, the valve assembly 74 may include a material, e.g., wax, that thermally expands to actuate the valve assembly 74 based on temperature of the oil 68. In alternative embodiments, the valve assembly may be electronically controlled.

The valve assembly 74 includes an inlet 82 and at least two outlets. The number of outlets may depend on the number of modes of the thermal-management system 60. In the illustrated embodiment, the valve assembly 74 includes three outlets 84, 86, 88 each corresponding to one of the three modes (heating, bypass, and cooling). Other thermal-management systems may only include two modes, such as heating and bypass, cooling and bypass, or heating and cooling, in which case, the valve may include two outlets. The valve assembly 74 includes an internal valve (not shown) that selectively connects the inlet 82 to one of the outlets 84, 86, 88 to switch the thermal-management system 60 between the modes of operation.

The thermal-management system 60 includes a heating loop 90 connected to the outlet 84. The heating loop 90 is configured to increase the temperature of the oil and provide the heated oil onto various components of the differential 40. The heating loop 90 includes a viscous-dissipation heater 92 such as nozzle or orifice plate that are configured to heat the oil. The viscous-dissipation heater 92 heats the oil by manipulating fluid pressure rather than using an electric heater or an external heat source. The viscous-dissipation heater 92 has an orifice that is smaller than the upstream conduit to create heat through viscous dissipation (sometimes called viscous heating). The orifice substantially boosts the oil pressure within the heating loop 90 so that viscous dissipation generates enough thermal energy to heat the oil 68. The oil pressure within the heating loop 90 may be as high as 1000 pounds per square inch (psi) depending upon a variety of factors such as flow rate of the oil, pipe size, oil type, orifice diameter, differential heating requirements, and the like. The heating loop 90 may include different conduit and other component than the other loops to account for these higher oil pressures (the other loops may include oil pressures of less than 15 psi for example). The viscous-dissipation heater 92 may include an input side connected to the outlet 84 by conduit 94 and an output side. The viscous-dissipation heater 92 may be mounted on the inside surface 78 of the cover 72 or other portion of the housing 70. The viscous-dissipation heater 92 sprays the heated oil within the housing 70. In other embodiments, an electric heater may be used instead of the viscous-dissipation heater 92.

The thermal-management system 60 may also include a bypass loop 100 connected to the outlet 86. The bypass loop 100 recirculates the oil 68 passing through the valve assembly 74 back to the sump 66. The bypass loop 100 may include one or more conduit 102 that circulates the oil from the valve assembly 74 back to the sump 66. The conduit 102 may extend all the way back to the sump or may include a non-restrictive nozzle or other feature that sprays the oil within the differential housing 70.

The thermal-management system 60 may further include a cooling loop 104 connected to the outlet 88. The cooling loop 104 may include a heat exchanger 106 that is mounted external to the differential assembly 26. For example, the heat exchanger 106 may be attached to a body or frame component 107 of the vehicle 20 (see FIG. 1). The heat exchanger 106 may be an oil-to-air heat exchanger configured to transfer thermal energy of the oil 68 to the ambient air. The heat exchanger 106 may be placed in a location that receives a substantial amount of ram air to improve efficiency. Ducts, scoops, or the like may be used to channel airflow through the heat exchanger 106. In some embodiment, a fan may be provided to increase airflow. The cooling loop 104 may include a supply conduit 108 connecting the outlet 88 to the heat exchanger 106 and a return conduit 110 that circulates cooled oil from the heat exchanger 106 back to the sump 66. Both the return and the supply conduit 110, 108 and a may include multiple segments some of which are disposed inside the housing 70 and some of which are external to the housing 70. The conduit may have flexible portions to allow relative movement between the differential assembly 26 and heat exchanger 106.

Figure 5A:
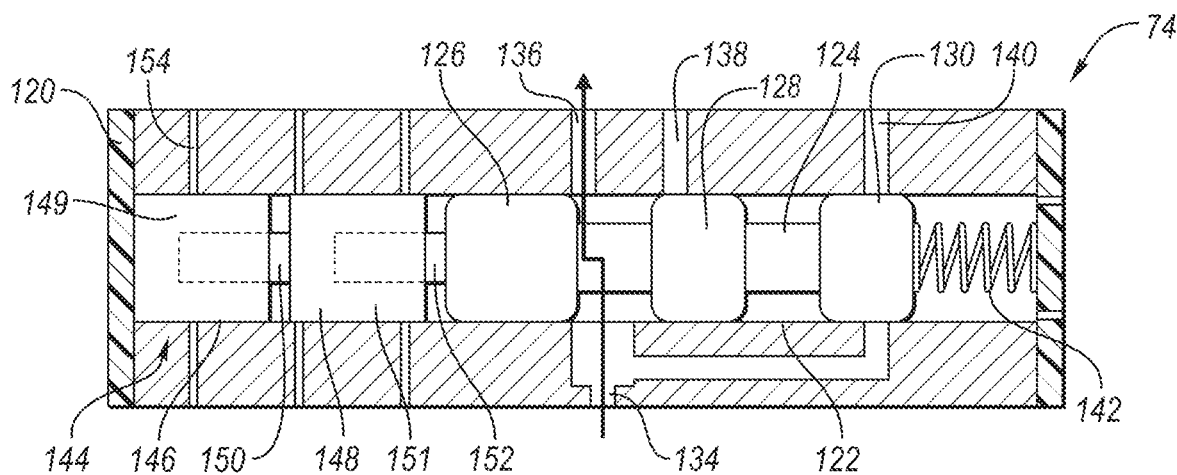
FIG. 5A is diagrammatical view of spool valve of the thermal management system in a first position.
Figure 5B:
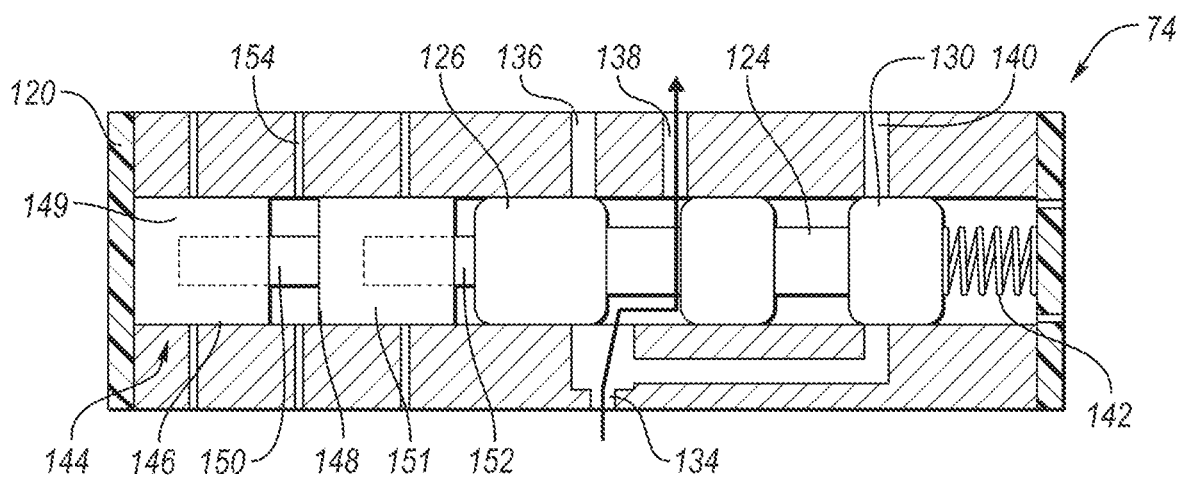
FIG. 5B shows the spool valve in a second position.
Figure 5C:
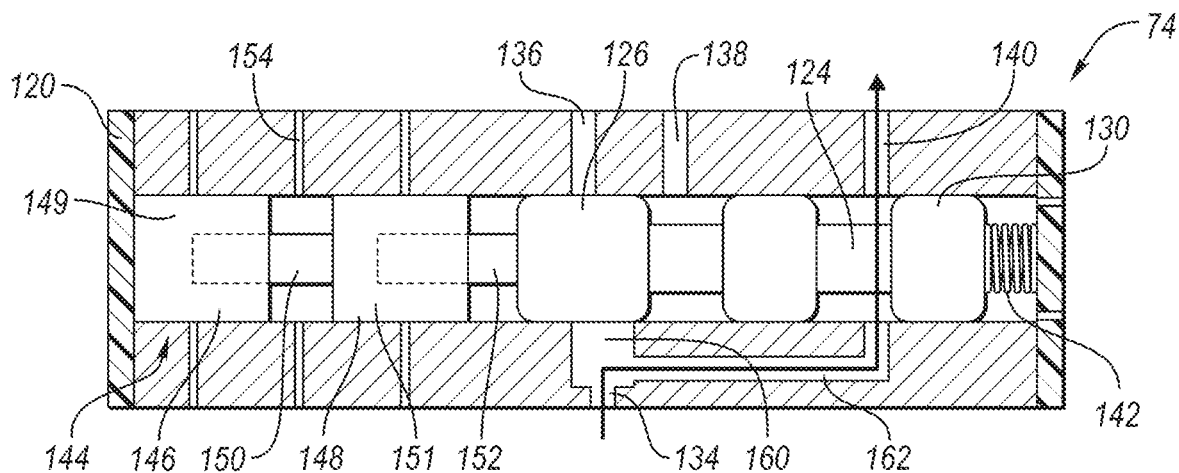
FIG. 5C shows the spool valve in a third position.

FIGS. 5A, 5B, and 5C illustrate one example embodiment of the valve assembly 74. Here, the valve assembly 74 is a spool valve that is actuated by a material having a relatively high coefficient of thermal expansion, such as wax. The valve assembly 74 includes a housing 120 defining a valve bore 122, which may be cylindrical in shape. A spool valve 124 is disposed within the valve bore 122 and includes a plurality of lands 126, 128, and 130. The lands may be disk-shaped having a diameter that approximates the diameter of the bore 122. The lands are axially spaced apart from each other on the spool valve 124 to create passageways between adjacent ones of the lands. The body further defines an inlet 134 and three outlets 136, 138, and 140 in the illustrated embodiment. The inlet 134 receives pressurized oil from the pump 62. The outlet 136 is connected to the heating loop 90, the outlet 138 is connected to the bypass loop 100, and the outlet 140 is connected to the cooling loop 104. The spool valve 124 is slidable along the bore 122 to selectively connect the inlet 134 in fluid communication with one of the outlets. For example, the spool valve 124 includes a first position (FIG. 5A) in which the inlet 134 is in fluid communication with the outlet 136 to place the thermal-management system 62 in heating mode, a second position (FIG. 5B) in which the inlet 134 is in fluid communication with the outlet 138 to place the thermal-management system 62 in bypass mode, and a third position (FIG. 5C) in which the inlet 134 is in fluid communication with the outlet 140 to place the thermal-management system 62 in cooling mode. The spool valve 124 may be biased to one of the positions, e.g., the first position, by a resilient member 142 such as a coil spring or the like. The resilient member 142 may be disposed within the bore 122 and connected between one of the lands, e.g., land 130, and the housing 120. An actuator 144 slides the spool valve 124 to switch between the first, second, and third positions.

The actuator 144 includes one or more thermostatic devices that automatically actuate the spool valve 124 based on temperature. Using the thermostatic device eliminates the need for electronic controls, however, the actuator 144 may be electric in other embodiments. The actuator 144 may include two thermostatic devices 146, 148 that each contain wax that automatically expands once an activation temperature is reached. The expanding wax can be used to slide the spool valve 124 between different positions. The thermostatic devices 146, 148 may be disposed within the bore 122 in series as shown. The thermostatic devices 146, 148 include a first chamber 149 and a second chamber 151, respectively, that are filled with the wax (or suitable material) and include an associated piston 150 and 152, respectively. The pistons 150, 152 extend into their respective chambers and are acted upon by the wax. The expanding wax drives the pistons 150, 152 to actuate the spool valve 124. The thermostatic devices 146, 148 may include return springs (not shown) that de-stroke the pistons or, as illustrated, the resilient member 142 may de-stroke the pistons 150, 152. The first device 146 may be fixed within the bore 122 whereas the second device 148 is slidably disposed within the bore 122. The piston 150 is connected to the second device 148 and the piston 152 is connected to the spool valve 124. The waxes within the chambers 149, 151 are configured to activate (expand) at different temperatures. For example, the chamber 149 may activate at 20, 30, 40, 50, or 60 degrees Celsius (C) and the chamber 151 may activate at 80, 90, or 100 degrees C. These are of course merely examples. The activation temperatures can be changed to switch between the modes as desired. The placement of the first and second devices can be switched so that the device with the lower activation temperature is adjacent to the spool valve 124.

The devices 146, 148 are immersed in the oil 68 to obtain an accurate reading of oil temperature. The housing 120 may include one or more openings 154 to place the devices 146, 148 in direct contact with the oil 68. The remaining portions of the valve 74 may also be disposed within the oil 68 or may be outside of the oil 68.

The resilient member 142 may bias the spool valve 124 to the first position which corresponds to the thermal-management system 62 being in heating mode. In the first position, the lands 128 and 130 seal their respective outlets 138 and 140 so that all of the oil entering the inlet port 134 is routed to the outlet port 136 between the land 126 and the land 128. The spool valve 124 will remain in the first position until a temperature of the oil 68 reaches an activation temperature (first threshold temperature) of the wax within the chamber 149, such as 20 degrees C. That is, the thermal-management system is configured to be in heating mode until the oil exceeds the first threshold temperature. The expanding wax strokes the piston 150 to the right moving the second device 148 and the spool valve 124 to place valve 124 in the second position, which corresponds with the bypass mode. In the second position, the piston 150 is stroked, whereas the other piston 152 is contracted. The spool valve 124 is moved to the third position in response to the temperature of the oil 68 exceeding the activation temperature of the second device 148 (second threshold temperature). That is, the thermal-management system remains in the bypass mode when the oil temperature is between the first and second thresholds. When in the bypass mode, the oil 68 will be heated by friction of the differential 40. In the third position, both of the pistons 150 and 152 are stoked to place the land 126 over a main passage 160 to route the oil through a secondary passage 162 that is now in fluid communication with the outlet 140, which corresponds with the cooling mode.

The above described example is yet one possible embodiment of a passive valve assembly. In an alternative embodiment, the second device and the piston may have a hollow center allowing the other piston to extend therethrough and directly connect to the spool valve 124. Here, the second device 148 is stationary within the bore 122. In another embodiment, the first and second devices 146, 148 be stacked instead of being arranged in series. Here, each of the devices may be fixed within the bore and each piston engages with the spool valve. The pistons have different lengths so that the valve is actuated to different positions when the activation temperatures are reached.

Figure 6:
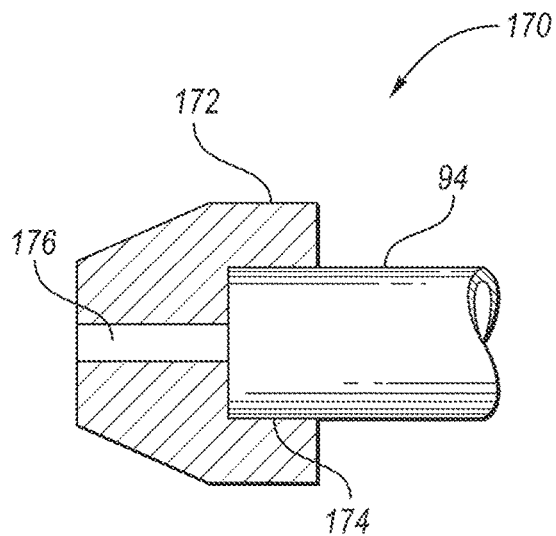
FIG. 6 is a cross-sectional view of a viscous-dissipation heater having a fixed orifice.

Referring to FIG. 6, the heater 92 may be a restriction nozzle 170 including a body 172 defining an inlet port 174 that is connected to the conduit 94 and a restriction orifice 176. A diameter of the restriction orifice 176 is substantially smaller than the diameter of the inlet port 174 such that viscous heating occurs. The orifice 176 is sized to generate sufficient pressure and flow rate of the oil upstream of the orifice 176. The orifice may be sized such that oil pressures of 500 to 1000 psi are present upstream of the heater 92.

Figure 7:
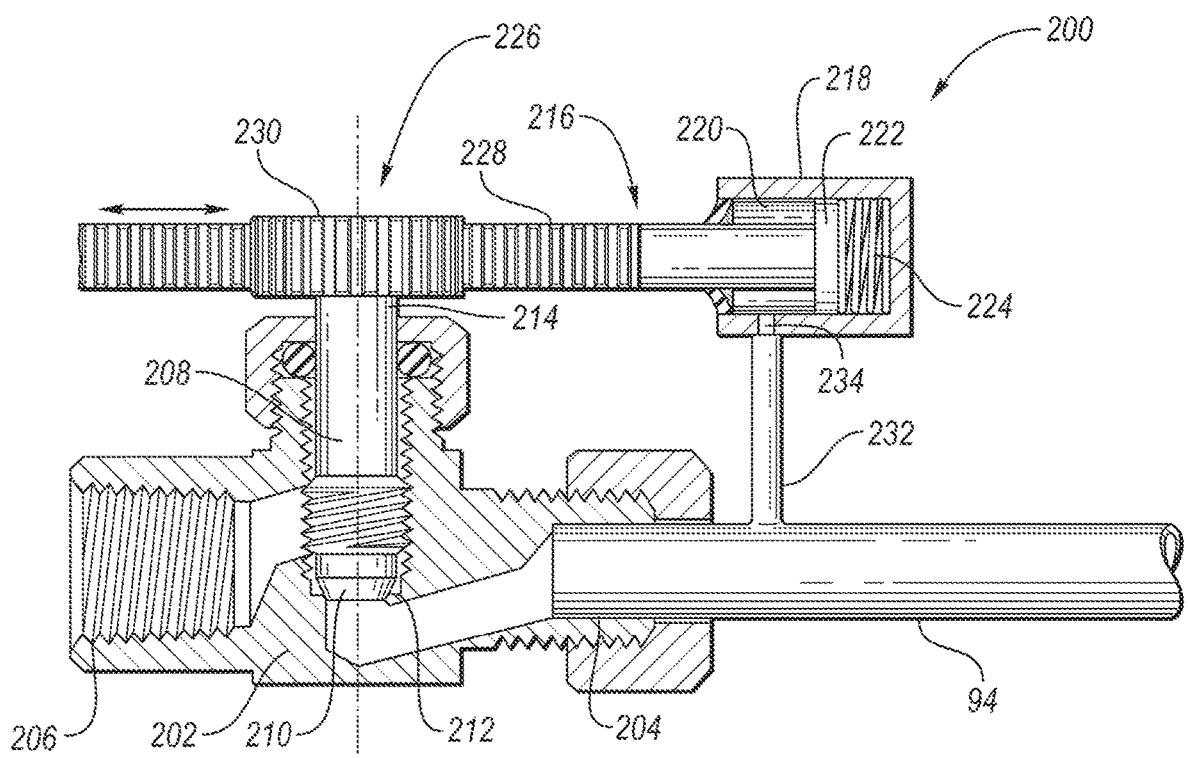
FIG. 7 is a diagrammatical view, in partial cross section, of a viscous-dissipation heater assembly having a variable orifice.

FIG. 7 shows the viscous-dissipation heater 92 according to another embodiment. The heater may be a viscous-dissipation heater assembly 200 that, unlike the nozzle 170, is adjustable so that the amount of restriction can be increase or decreased based on the oil pressure in conduit 94. If the pump 62 is a positive displacement pump and driven by the differential 40, the pressure within the system will increase and decrease as vehicle speed changes. Thus, increase in vehicle speed will increase the heating of the oil by the viscous-dissipation heater assembly 200 unless the restriction is reduced. The assembly 200 is configured to change the restriction as line pressure changes to produce a more uniform heating effect, i.e., reduce restriction as line pressure increases and increase restriction as line pressure decreases.

The assembly 200 includes a body 202 defining an inlet 204 and an outlet 206. A valve 208 is disposed within the body 202 between the inlet 204 and the outlet 206. The valve 208 includes a metering portion 210 that engages with a seat 212 and a driven portion 214 that is external to the body 202. The valve 208 may be threadably received within the body 202 such that rotation of the valve 208 in a first direction moves the metering portion 210 away from the seat 212 to increase the opening of the valve (less restriction) and such that rotation of the valve 208 in a second direction moves the metering portion 210 towards the seat 212 to reduce the opening (more restriction). Generally, increasing the opening reduces the heating effect and decreasing the opening increases the heating effect of the heating valve assembly 200.

An actuator arrangement 216 is configured to rotate the valve 208. The actuator arrangement 216 may operate based on line pressure so that electronics are not required. In other embodiments, however, the actuator arrangement may be electric. The actuator arrangement 216 may include a hydraulic cylinder 218 defining a hydraulic chamber 220. A piston 222 is disposed within the chamber 220. The piston 222 is biased in a first direction by a resilient member 224, e.g., a coil spring. A drive mechanism 226 connects the piston 222 to the driven portion 214 of the valve 208. The drive mechanism 226 may be a rack-and-pinion assembly. A rack gear 228 is connected to the piston 222, and a pinion gear 230 is connected to the driven portion 214. The pinion 230 includes gear teeth in meshing engagement with gear teeth of the rack 228. Movement of the rack 228 in the first direction (left) rotates the valve in the second direction to increase the opening, and movement of the rack 228 in the second direction (right) rotates the valve 208 in the first direction to decrease the opening.

The hydraulic chamber 220 is in fluid communication with the conduit 94 via a sensing line 232 and an orifice 234 that is defined in the body 218 and opens into the hydraulic chamber 220. The sensing line 232 is in fluid communication with the same conduit as the inlet 204. The oil pressure within the hydraulic chamber 220 is substantially equal to the pressure within the conduit 94. The resilient member 224 biases the valve 208 to a first position when the line pressure is insufficient to compress the resilient member 224. The first position has the most restrictive opening of the valve to promote sufficient heating at lower flow rates. When line pressure increases above a threshold, the piston 222 will begin to compress the resilient member 224 causing the opening between the metering portion 210 and the seat 212 to increase in size. While this reduces the restriction within the assembly 200, the increased oil flow rate causes the oil to be heated by roughly a same amount as when in the first position. The actuator arrangement 216 will continually adjust the opening of the assembly 200 based on the sensed line pressure to provide a more consistent heating of the oil compared to a fixed orifice.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A differential assembly comprising:
    a housing defining an oil sump;
    a differential disposed in the housing; and
    a thermal-management system including:
        an oil pump in fluid communication with the sump,
        an oil-to-air heat exchanger external to the housing, and
        a passive valve assembly having an inlet connected to the pump, a first outlet connected to the heat exchanger, and a second outlet connected to a conduit disposed within the housing, the valve assembly further having a valve movable to a first position in which the inlet and the first outlet are in fluid communication and to a second position in which the inlet and the second outlet are in fluid communica- tion, wherein the valve is configured to be in the first position in response to the oil exceeding a first threshold temperature.

2. The differential assembly of claim 1, wherein the valve is configured to be in the second position when the oil is less than the first threshold temperature.

3. The differential assembly of claim 1, wherein the valve is configured to be in the second position when the oil is less than the first threshold temperature and greater than a second threshold temperature.

4. The differential assembly of claim 1, wherein the valve assembly further has a third outlet connected to a viscous-dissipation heater having an inlet and an orifice that is smaller than the inlet and sized to heat the oil through viscous dissipation, and wherein the valve is further movable to a third position in which the inlet and the third outlet are connected in fluid communication.

5. The differential assembly of claim 4, wherein the valve is configured to be in the third position when the oil is less than a second threshold temperature and is configured to be in the second position when the oil is between the first and second threshold temperatures.

6. The differential assembly of claim 4, wherein the orifice has a fixed size.

7. The differential assembly of claim 1, wherein the valve assembly further has a third outlet, and the thermal-management system further includes a viscous-dissipation heater assembly including:
a body defining an inlet connected to the third outlet,
a second valve disposed in the body and actuatable to adjust an opening of the viscous-dissipation heater assembly, and
an actuator including a hydraulic cylinder in fluid communication with the third outlet, the actuator being driveably connected to the valve and configured to actuate the valve to adjust a size of the opening.

8. The differential assembly of claim 1, wherein the valve is a slidable spool, and wherein the valve assembly further has a passive actuator connected to the spool and configured to slide the spool between the first and second positions.

9. The differential assembly of claim 8, wherein the passive actuator includes a thermal expansion material.

10. The differential assembly of claim 9, wherein the material is wax.

11. The differential assembly of claim 5, wherein the valve is a slidable spool, and wherein the valve assembly further has a first passive actuator with a first piston configured to slide the spool and a second passive actuator with a second piston configured to slide the spool, wherein the spool is biased to the third position, the first actuator is configured to move the spool to the second position in response to the oil exceeding the second threshold temperature, and the second actuator is configured to move the spool to the first position in response to the oil exceeding the first threshold temperature.

12. The differential assembly of claim 11, wherein the first and second actuators each include a chamber filled with wax configured to actuate the first and second pistons, respectively.

13. The differential assembly of claim 11, wherein the valve defines a bore, and the spool, the first passive actuator, and the second passive actuator are is disposed in the bore, wherein the first and second passive actuators are arranged in series with the first piston connected to the second actuator and the second piston connected to the spool.

14. The differential assembly of claim 1, wherein the pump is driven by the differential.

* * * * *